(12) United States Patent
Schromm et al.

(10) Patent No.: US 9,366,485 B2
(45) Date of Patent: Jun. 14, 2016

(54) METHOD FOR PRODUCING TABLETS CONTAINING AMMONIUM NITRATE

(75) Inventors: Hans-Kurt Schromm, Backnang (DE); Matthias Kleinhans, Fellbach (DE)

(73) Assignee: SANDVIK MATERIALS TECHNOLOGY DEUTSCHLAND GMBH, Duesseldorf (DE)

( * ) Notice: Subject to any disclaimer, the term of this patent is extended or adjusted under 35 U.S.C. 154(b) by 620 days.

(21) Appl. No.: 13/809,664

(22) PCT Filed: Jul. 6, 2011

(86) PCT No.: PCT/EP2011/061396
§ 371 (c)(1),
(2), (4) Date: Jan. 11, 2013

(87) PCT Pub. No.: WO2012/007331
PCT Pub. Date: Jan. 19, 2012

(65) Prior Publication Data
US 2013/0112370 A1     May 9, 2013

(30) Foreign Application Priority Data
Jul. 16, 2010    (DE) .......................... 10 2010 032 021

(51) Int. Cl.
*B29B 9/10*          (2006.01)
*F28D 19/00*       (2006.01)
(Continued)

(52) U.S. Cl.
CPC . *F28D 19/00* (2013.01); *B01J 2/26* (2013.01); *C01C 1/18* (2013.01); *C05B 7/00* (2013.01); *C05C 1/02* (2013.01); *C05G 3/0094* (2013.01)

(58) Field of Classification Search
CPC ................ C05B 7/00; C01C 1/18; B01J 2/26; B01J 2/12; C05C 1/02; C05D 9/02

USPC .......................................... 264/8, 13; 425/6, 8
See application file for complete search history.

(56) References Cited

U.S. PATENT DOCUMENTS

| | | |
|---|---|---|
| 3,539,326 A | 11/1970 | Otsuka et al. |
| 3,900,164 A | 8/1975 | Friestad |

(Continued)

FOREIGN PATENT DOCUMENTS

| | | |
|---|---|---|
| AT | 372 361 | 9/1983 |
| DE | 1 592 793 | 3/1971 |

(Continued)

OTHER PUBLICATIONS

ChemicalLand21.com; NPK Fertilizer; Apr. 15, 2006; https://web.archive.org/web/20060415080036/http://www.chemicalland21.com/industrialchem/inorganic/NPK.htm.*

(Continued)

*Primary Examiner* — Yogendra Gupta
*Assistant Examiner* — Ninh Le
(74) *Attorney, Agent, or Firm* — Flynn, Thiel, Boutell & Tanis, P.C.

(57) ABSTRACT

A method for producing tablets containing ammonium nitrate, including dripping a product melt containing ammonium nitrate with a drop former having a rotating, pierced drum and a nozzle strip contacting an inner face of the pierced drum, so that the product melt is pressed through openings of the pierced drum. The method additionally includes placing the product drops on a circulating cooling conveyor belt, and solidifying the product drops during the transport on the cooling conveyor belt by cooling and removing the solidified product drops from the cooling conveyor belt.

20 Claims, 1 Drawing Sheet

(51) Int. Cl.
*B01J 2/26* (2006.01)
*C01C 1/18* (2006.01)
*C05B 7/00* (2006.01)
*C05C 1/02* (2006.01)
*C05G 3/00* (2006.01)

(56) References Cited

U.S. PATENT DOCUMENTS

| | | | |
|---|---|---|---|
| 4,316,736 | A | 2/1982 | Van Hijfte et al. |
| 8,349,229 | B2 | 1/2013 | Schromm et al. |
| 2004/0156935 | A1 | 8/2004 | Lumley et al. |
| 2006/0013755 | A1 | 1/2006 | Isaksen et al. |
| 2010/0288005 | A1 | 11/2010 | Schromm et al. |
| 2011/0017130 | A1* | 1/2011 | Schromm et al. ............ 118/300 |

FOREIGN PATENT DOCUMENTS

| | | |
|---|---|---|
| DE | 2 411 024 | 9/1974 |
| DE | 10 2007 061 408 A1 | 6/2009 |
| DE | WO2009/100839 A2 * | 8/2009 ............... B01J 2/20 |
| GB | 754843 | 8/1956 |
| WO | WO 97/14665 | 4/1997 |
| WO | WO 03/106376 A1 | 12/2003 |
| WO | WO 2004/039722 A1 | 5/2004 |
| WO | WO 2006/111331 A1 | 10/2006 |

OTHER PUBLICATIONS

Heinrich et al.; Ullmann's Encyclopedia of Industrial Chemistry; Jun. 15, 2000;Wiley-VCH Veriag GmbH & Co. KGaA; pp. 1-121.*
Sandvik "Rotoform Process: New Performance Standards in Premium Pastillation"; Aug. 2007;pp. 1-16.*
International Search Report issued in International Application No. PCT/EP2011/061396 mailed Oct. 13, 2011 (6 pages).
D.H. Booth and V.C. Vinyard, "Density and Viscosity of Ammonium Nitrate, Ammonium Nitrate-Potassium Chloride and Ammonium Nitrate-Ammonium Phosphate Melts", Journal of Applied Chemistry, vol. 17, No. 3, Mar. 1967, pp. 86-88, XP-002660041.
Office Action from German Patent Office dated Jun. 9, 2011 for parallel German Application No. 10 2010 032 021.8 (7 pages).

* cited by examiner

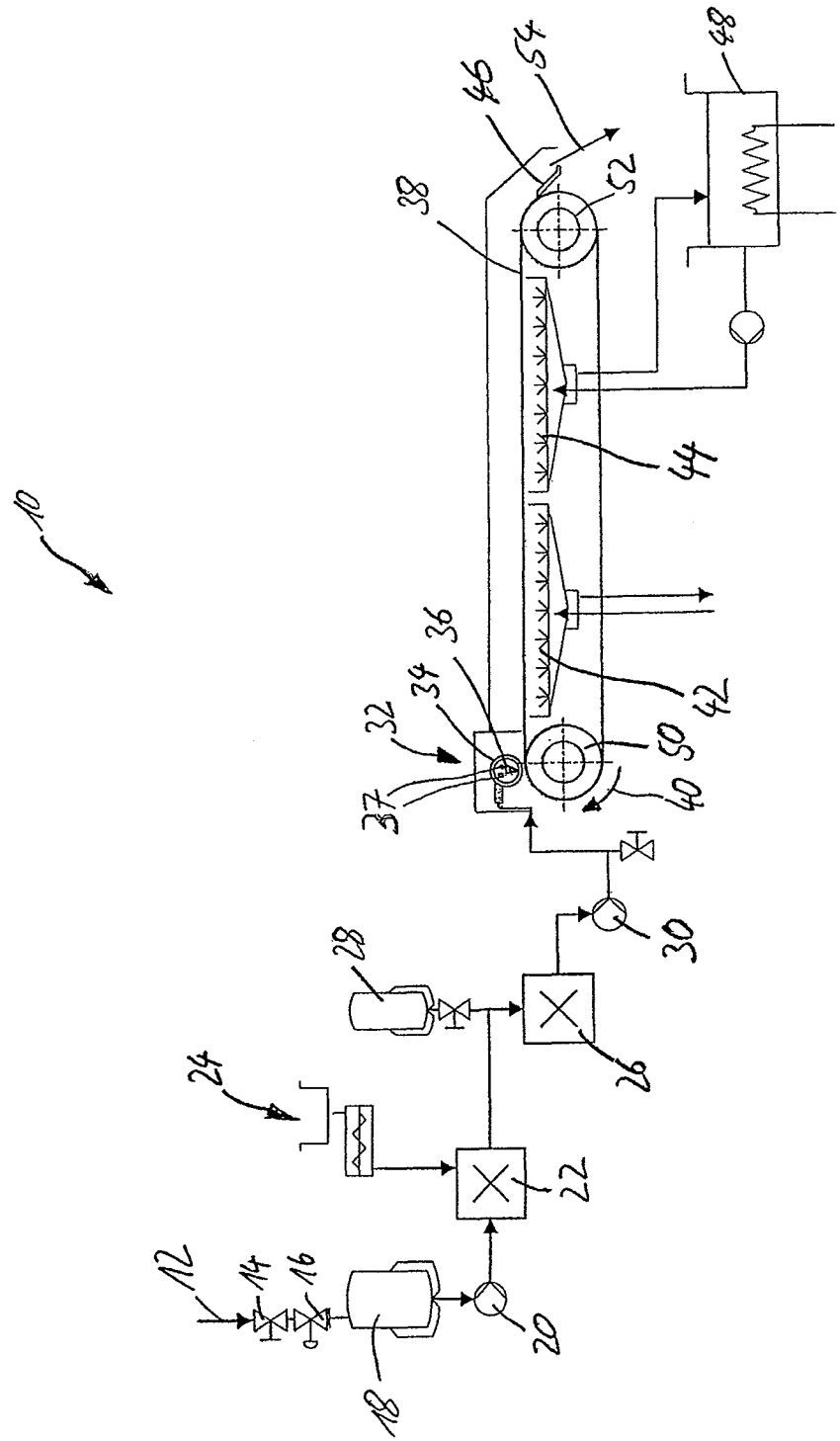

METHOD FOR PRODUCING TABLETS CONTAINING AMMONIUM NITRATE

FIELD OF THE INVENTION

The invention relates to a method for producing tablets containing ammonium nitrate.

BACKGROUND OF THE INVENTION

Ammonium nitrate is used as an ingredient in many fertilizers. In particular Ammonium nitrate is used to provide nitrogen in so-called NPK-fertilizers, i.e. fertilizers containing nitrogen, phosphor and potassium in different proportions. The property of ammonium nitrate of being able to explode when heated can lead to problems. Said explosion tendency of ammonium nitrate is problematic in the production and handling thereof when producing fertilizer mixtures.

SUMMARY OF THE INVENTION

The invention is intended to provide an improved method for producing tablets containing ammonium nitrate.

To that end and according to the invention, a method for producing tablets containing ammonium nitrate is provided, including the following steps: dripping a product melt containing ammonium nitrate by means of a drop former having a rotating, pierced drum and a nozzle strip contacting an inner face of the pierced drum, so that the product melt is pressed through the openings of the pierced drum, placing the product drops on a circulating cooling conveyor belt, solidifying the product drops by cooling during transport on the cooling conveyor belt and removing the solidified product drops from the cooling conveyor belt as tablets.

The method according to the invention allows the production of tablets containing ammonium nitrate with sustained product quality and high output. The tablets produced can be handled without any problems immediately after removal from the cooling conveyor belt and, for example, be packaged. Since the product drops are already solidified when removed, there is no reason to fear that the product drops might stick together or that they might be damaged in any way due to handling of the same. By means of the method according to the invention, it is furthermore possible to keep the temperatures of the product melt containing ammonium nitrate within such a tight tolerance range that on the one hand processing of the product melt is possible without any problems and that the latter is sufficiently fluid to be pressed through the nozzle strip and the openings in the pierced drum and on the other hand a danger of explosion of the ammonium nitrate can be avoided. Furthermore, in the method according to the invention, the temperature of the product melt containing ammonium nitrate is kept within such a tight tolerance range that there is no danger of decomposition of the ammonium nitrate contained therein. The method according to the invention uses a product melt containing ammonium nitrate which has been produced in a conventional manner and then made available.

In a further embodiment of the invention, the product drops are placed on the cooling conveyor belt, the product drops having a temperature of less than 180° C., in particular 177° C.

Such a temperature turned out to be extremely advantageous, in particular for pure ammonium nitrate. Here, a temperature is set deliberately which is comparatively close to the decomposition temperature of ammonium nitrate of 180° C. However, the method according to the invention allows keeping the temperature of the product melt essentially constant and within a tight tolerance range by means of the rotating, pierced drum and the nozzle strip contacting the inner face of the pierced drum.

In a further embodiment of the invention, the product drops are cooled to less than 50° C. on the cooling conveyor belt, in particular 40° C.

The cooling of the product drops containing ammonium nitrate to a temperature of less than 50° C. on the cooling conveyor belt has turned out to be advantageous, since the product drops are reliably solidified below a temperature of 50° C. and already have such a hardy surface that they can be removed from the cooling conveyor belt without having to fear damages and, for example can be packaged.

In a further embodiment of the invention, it is provided that the product drops remain on the cooling conveyor belt for a period of approximately 15 seconds.

Such retention time on the cooling conveyor belt is enough for obtaining a sufficiently strong solidification of the product drops and on the other hand it is long enough as to not fear cracks in the tablets produced caused by rapid setting of the product melt.

In a further embodiment of the invention, a temperature of the cooling conveyor belt is kept higher in a section immediately upstream of the removal point than immediately downstream of the placing point.

By means of such a re-heating of the product tablets immediately upstream of the removal point, the quality of the tablets produced can be further improved and also the shape of the tablets may be changed again, for example.

In a further embodiment of the invention, the product melt contains bentonite, dolomite and/or calcium carbonate.

By means of such fill materials the explosion risk can be significantly reduced for the tablets produced and the riskless use as a fertilizer is possible.

In a further embodiment of the invention, the product melt contains potassium chloride.

Different admixtures are used depending on the application purpose of the produced particles or tablets respectively, whereby, surprisingly, the method according to the invention is suitable for numerous different mixtures containing ammonium nitrate. Especially potassium chloride is mixed with the product melt if a so-called MOP-fertilizer is to be produced.

In a further embodiment of the invention, the product melt contains sulfates, in particular potassium sulfate, ammonium sulfate and/or aluminum sulfate.

Sulfates are mixed with the product melt if a so-called SOP-fertilizer is to be produced. Surprisingly, the method according to the invention allows a wide range of mixture ratios and mixture components.

In a further embodiment of the invention, the product melt contains magnesium nitrate.

For example, a product melt containing ammonium nitrate and 3.3% of magnesium nitrate are processed into tablets.

In a further embodiment of the invention, the product melt contains phosphates, in particular potassium dihydrogen phosphate and diammonium hydrogen phosphate and/or phosphorous pentoxide.

In a further embodiment of the invention, the product melt contains trace elements, in particular sulfur, zinc or boron.

BRIEF DESCRIPTION OF THE DRAWINGS

Further features and advantages of the invention result from the claims and the subsequent description of preferred embodiments of the invention in connection with the drawings. Individual features of the different embodiments described can be combined in any manner without extending the scope of the present invention.

FIG. 1 shows a schematic view of a device for conducting the method according to the invention.

DETAILED DESCRIPTION

The schematical illustration in the single FIGURE shows a device 10 for producing tablets containing ammonium nitrate for conducting the method according to the invention. Melted ammonium nitrate or a product melt containing ammonium nitrate having several components which can be produced in a conventional manner is introduced through a needle valve 14 and a pneumatic valve 16 according to an arrow 12 into a container 18, which is equipped with level sensors. By means of the level sensors, a filling level in the container 18 can be maintained within a predefined range by means of a control of the pneumatic valve 16. For clarity purposes, a suitable control unit is not illustrated. Downstream of an outlet of the container 18 a pump 20 is provided to supply the fluid product melt containing ammonium nitrate to a mixer 22. In the mixer 22, a mixture of the fluid product melt and a solid matter can be produced which can be supplied to the mixer 22 via a solid matter dosing system 24. In case solid components are not to be added to the fluid product melt, the fluid product melt is led through the mixer 22 or the mixer 22 is completely dispensed with.

Downstream of the mixer 22 a mill 26 is provided in order to crush solid mater that might still be contained in the product melt. Upstream of the mill 26 and in a branch line branching off from the connection line between the mixer 22 and the mill 26, a buffer container 28 is provided. The buffer container serves to catch a possible backlog of the mill 26 and also to prevent the mill 26 from idling.

Downstream of the mill 26 another pump 30 is provided in order to supply the product melt to a drop former 32. The drop former 32 has a rotating, pierced drum 34 and a fixed nozzle strip 36 within the rotating drum 34, which nozzle strip contacts the inner face of the pierced drum 34 with its nozzle openings and which remains stationary in relation to the rotating, pierced drum 34. The fluid product melt is pressed against the inner face of the rotating drum 34 by means of the nozzle strip 36 and pressed through the openings in the rotating drum 34. Thus the product melt can get through the openings of the rotating drum, whereby resulting product drops are then placed on a circulating cooling conveyor belt 38 which is arranged underneath the drop former 32. Besides the nozzle strip 36, heating pipes 37 are provided in the rotating drum 34 in order to keep both the nozzle strip 36 as well as the rotating drum 34 at a temperature that prevents solidifying or crystallizing of the product melt to be processed and which lies within a tight tolerance range.

The cooling conveyor belt 38 runs in a direction indicated by means of a curved arrow 40. The product drops placed on the cooling conveyor belt 38 are transported to the right in the illustration of the FIGURE and solidify during their movement on the cooling conveyor belt. The cooling conveyor belt 38 is sprayed with cooling water from below by means of spray nozzles 42. The spray nozzles 42 are arranged in a first block and a second block with spray nozzles 44 being provided downstream in relation to the circulation direction of the cooling conveyor belt 38. The spray nozzles 44 can be charged with cooling water which temperature differs from the water temperature of the spray nozzles 42 and, for example, the spray nozzles 44 can be used to get the cooling conveyor belt 38 immediately upstream of a removal point 46 to a temperature which is higher than a temperature of the cooling conveyor belt above the spray nozzles 42 or in the placing point underneath the drop former 32. For this purpose, the cooling water sprayed by the spray nozzles 44 can originate from a container 48 which can be pre-heated by a heating coil.

The cooling conveyor belt 38 is configured as a circulating steel conveyor belt and set around two deflection rollers 50, 52. The deflection rollers 50, 52 can, for example, be cooled or heated in order to be able to set a desired temperature of the cooling conveyor belt 38 as precisely as possible.

After a deflection of the cooling conveyor belt 38 at the deflection roller 52 by approximately 45°, a removal device 46 is provided, having a removal knife contacting the cooling conveyor belt 38. By means of this removal knife of the removal device 46 the solidified tablets are removed from the cooling conveyor belt and fall in the direction according to an arrow 54 due to gravitational force. The solidified tablets can, for example, then be caught and packaged or also be further transported by means of conveyor belts.

The product drops generated by the drop former 32 are placed on the upper run of the cooling conveyor belt 38. In the area of the lower run of the cooling conveyor belt 38 or in the area of the deflections around the deflection rollers 50, 52, for example, cleaning devices for cleaning the surface of the cooling conveyor belt 38 can be provided or also devices can be provided for coating the cooling conveyor belt 38 with a separating means. Such a separating means is used to ensure an easy separation of the solidified tablets from the cooling conveyor belt 38.

In the context of trials, it was possible to produce tablets consisting of pure ammonium nitrate by means of the device 10. A placing temperature of the product melt, i.e. a temperature at which the product drops leave the pierced drum 34 of the drop former 32 and are then placed on the surface of the cooling conveyor belt 38, was 177° C. Then the product drops remained on the upper run of the cooling conveyor belt 38 for a period of approximately 15 seconds until reaching the removal point 46. The temperature of the solidified product drops or tablets at the removal point 46 was approximately 40° C. At this product temperature, the tablets could be handled without any problems, they were sufficiently stable against mechanical stress and also sticking together of the tablets removed from the cooling conveyor belt 38 could not be observed. By means of the device 10, 3,500 KG of tablets could be produced per hour in a trial run.

Besides pure ammonium nitrate, further product melts containing ammonium nitrate were tested by means of the device 10, for example product melts containing ammonium nitrate and up to 3% of aluminum sulfate, ammonium nitrate with 3.3% magnesium nitrate and ammonium nitrate with 9.7% ammonium sulfate. A product melt containing ammonium nitrate and up to 40% ammonium sulfate is advantageous.

Moreover, product melts containing ammonium nitrate and 19.4% potassium sulfate were tested whereby in this case higher admixtures of potassium sulfate are provided as well. Said compositions of product melts were pastillated with the previously mentioned process parameters for pure ammonium nitrate with good results.

Furthermore, so-called NPK-mixtures were pastillated by means of the device 10, whereby as a basis, in each case an ammonium nitrate melt was used to supply nitrogen. By means of the device 10 and the previously mentioned process parameters for pure ammonium nitrate, NPK-mixtures containing ammonium nitrate as well as further proportions such as phosphor and potassium between 0% and 20%, in particular NPK-mixtures 15-15-15 corresponding to 15% nitrogen, 15% phosphor, 15% potassium, as well as NPK 25-5-5, NPK 32-4-0 and NPK 20-20-0, were tested.

Furthermore, product melts containing ammonium nitrate, where applicable containing the previously described further components as well as further trace elements, were tested by means of the device 10 according to the invention. Pastillation of product melts containing sulfur, zinc and/or boron showed good results.

The invention claimed is:

1. A method for producing tablets containing ammonium nitrate comprising the following steps:
    dripping a product melt containing ammonium nitrate with a drop former having a rotating pierced drum and a nozzle strip contacting an inner face of the pierced drum so that the product melt is pressed through openings of the pierced drum to form product drops;
    placing the product drops on a circulating cooling conveyor belt at a temperature of 177° C.;
    solidifying the product drops during transport on the cooling conveyor belt by cooling the product drops to a temperature of less than 50° C.; and
    removing the solidified product drops from the cooling conveyor belt.

2. The method according to claim 1, wherein the product drops are cooled on the cooling conveyor belt to a temperature of 40° C.

3. The method according to claim 1, wherein the product drops remain on the cooling conveyor belt for a period of approximately 15 seconds.

4. The method according to claim 1, wherein a temperature of the cooling conveyor belt in an area immediately upstream of a removal point of the solidified product drops from the cooling conveyor belt is kept higher than a temperature of the cooling conveyor belt in an area immediately downstream of a placing point of the product drops on the cooling conveyor belt.

5. The method according to claim 1, wherein the product melt contains bentonite, dolomite and/or calcium carbonate.

6. The method according to claim 1, wherein the product melt contains phosphorous and potassium.

7. The method according to claim 1, wherein the product melt contains potassium chloride (KCl).

8. The method according to claim 1, wherein the product melt contains a sulfate.

9. The method according to claim 1, wherein the product melt contains magnesium nitrate $Mg(NO_3)_2$.

10. The method according to claim 1, wherein the product melt contains a phosphate.

11. The method according to claim 1, wherein the product melt contains at least one trace element.

12. The method according to claim 1, wherein the step of placing comprises placing the product drops onto the cooling conveyor belt at a placing point on the cooling conveyor belt disposed below the drop former, and the step of removing includes removing the solidified product drops from the cooling conveyor belt at a removal point disposed downstream from the placing point, and the method further comprises maintaining a temperature of the cooling conveyor belt at an area immediately upstream of the removal point higher than a temperature of the cooling conveyor belt at the placing point or at an area immediately downstream of the placing point.

13. The method according to claim 1, wherein the product melt contains a sulfate selected from the group consisting essentially of potassium sulfate ($K_2SO_4$), ammonium sulfate (($NH_4)_2SO_4$) and/or aluminum sulfate ($Al_2(SO_4)_3$).

14. The method according to claim 1, wherein the product melt contains a phosphate selected from the group consisting essentially of potassium dihydrogen phosphate ($KH_2PO_4$), diammonium hydrogen phosphate (($NH_4)_2HPO_4$) and/or phosphorous pentoxide ($P_2O_5$).

15. The method according to claim 1, wherein the product melt comprises trace elements of sulfur(S), zinc (Zn) and/or boron (B).

16. The method according to claim 1, wherein the product drops exit the pierced drum at the temperature of 177° C.

17. A method for producing tablets containing ammonium nitrate, said method comprising the steps of:
    supplying a drop former having a rotating pierced drum defining openings therein and a nozzle disposed in contact with an inner face of the pierced drum with product melt containing ammonium nitrate;
    forming the product melt into product drops by pressing the product melt through the openings of the pierced drum with the nozzle;
    placing the product drops onto a moving conveyor belt at a temperature of 177° C.;
    solidifying the product drops during transport on the conveyor belt by cooling the product drops to a temperature of less than 50° C.; and
    removing the solidified product drops from the conveyor belt.

18. The method according to claim 17, wherein the step of solidifying the product drops comprises cooling the product drops to a temperature of 40° C.

19. The method according to claim 17, further comprising maintaining the product drops on the conveyor belt for a period of approximately 15 seconds.

20. The method according to claim 17, wherein the step of placing includes placing the product drops onto the conveyor belt at a placing point below the drop former, the step of removing includes removing the solidified product drops from the conveyor belt at a removal point downstream from the placing point, and the method further comprises maintaining a temperature of the conveyor belt at an area immediately upstream of the removal point higher than a temperature of the conveyor belt at the placing point or at an area immediately downstream of the placing point.

* * * * *